United States Patent [19]

Lee et al.

[11] Patent Number: 5,126,832
[45] Date of Patent: Jun. 30, 1992

[54] CHARACTER SYNTHESIZER FOR INSERTING INTO VIDEO SIGNALS CHARACTERS HAVING THE COMPLEMENTARY COLORS WITH THE VIDEO SIGNALS

[75] Inventors: Hyo-Sam Lee; Sang-Jo Park, both of Suwon, Rep. of Korea

[73] Assignee: SamSung Electronics Co., Ltd., Suwon, Rep. of Korea

[21] Appl. No.: 607,747

[22] Filed: Oct. 31, 1990

Related U.S. Application Data

[63] Continuation of Ser. No. 424,726, Oct. 20, 1989, abandoned.

[30] Foreign Application Priority Data

Dec. 31, 1988 [KR] Rep. of Korea ............... 18091/1988

[51] Int. Cl.⁵ ........................................... H04N 5/278
[52] U.S. Cl. ...................................... 358/22; 358/183
[58] Field of Search ............. 358/22, 22 CR, 22 PIP, 358/183

[56] References Cited

U.S. PATENT DOCUMENTS 4,580,158 4/1986 Macheboeuf ................ 358/22

Primary Examiner—James J. Groody
Assistant Examiner—Mark R. Powell
Attorney, Agent, or Firm—Robert E. Bushnell

[57] ABSTRACT

A character synthesizer for inserting into video signals, characters having complementary colors of video signals. The character synthesizer includes a video decoder for decoding the incoming video color signals to produce color-difference signals, a color-phase detector for detecting the color-phase voltage of the color-difference signals, an excessive white detector for comparing the brightness signals with a reference voltage, a low saturation detector for comparing the color signals with the low saturation voltage, a character generator, a complementary color detecting and control device, a video encoder for encoding the color signals of the characters, a mixer for combining the incoming video signals and the video-encoded color signals of characters, and a delay device for delaying the character signals by the time necessary for the complementary color transformation and video encoding.

20 Claims, 9 Drawing Sheets

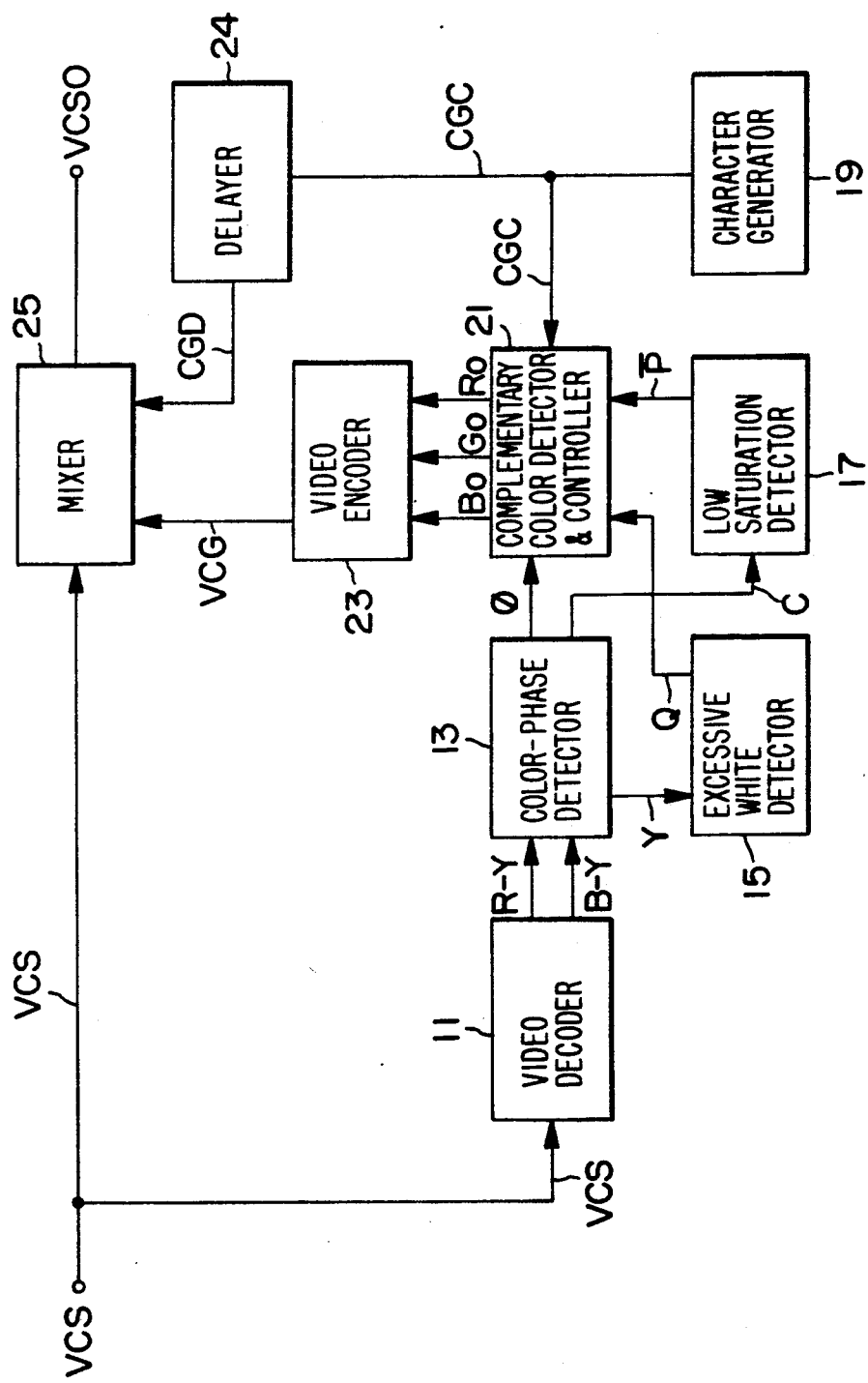
F I G. 1

FIG.5.(A)

| COLOR / OUTPUT | GRN | CYAN | BLUE | MAGANTA | RED | YELLOW |
|---|---|---|---|---|---|---|
| B1 | 0 | 0 | 0 | 1 | 1 | 1 |
| B2 | 0 | 1 | 1 | 0 | 0 | 1 |
| B3 | 1 | 0 | 1 | 0 | 1 | 0 |

FIG.5.(B)

| COLOR / OUTPUT | RED | MGT | YEL | CYN | GRN | BLN |
|---|---|---|---|---|---|---|
| R1 | 1 | 0 | 1 | 0 | 0 | 0 |
| G1 | 0 | 0 | 1 | 1 | 1 | 0 |
| B1 | 0 | 1 | 0 | 1 | 0 | 1 |

| INPUT/OUTPUT COLOR | INPUT | | | | | | | | OUTPUT | | | INPUT | |
|---|---|---|---|---|---|---|---|---|---|---|---|---|---|
| | A1 | A2 | A3 | A4 | A5 | A6 | A7 | A8 | B1 | B2 | B3 | E | P̄ |
| GREEN | 0 | 0 | 0 | 0 | 0 | — | 0 | 0 | 0 | 0 | — | 0 | — |
| CYAN | 0 | 0 | 0 | 0 | — | 0 | 0 | 0 | 0 | — | 0 | 0 | — |
| BLUE | 0 | 0 | 0 | — | 0 | 0 | 0 | 0 | 0 | 0 | — | 0 | — |
| MAGENTA | 0 | 0 | — | 0 | 0 | 0 | 0 | 0 | — | 0 | 0 | 0 | — |
| RED | 0 | — | 0 | 0 | 0 | 0 | 0 | 0 | — | — | — | 0 | — |
| YELLOW | — | 0 | 0 | 0 | 0 | 0 | 0 | 0 | 0 | — | 0 | 0 | — |
| WHITE | × | × | × | × | × | × | × | × | 0 | 0 | 0 | 0 | 0 |

FIG. 6

| R | G | B | IN CR CG CB | OUT RO GO BO |
|---|---|---|---|---|
| 0 | 0 | 0 | $C_R\ C_G\ C_B$ | WHITE |
| 0 | 0 | 1 | $C_R\ C_G\ C_B$ | $C_B$ |
| 0 | 1 | 0 | $C_R\ C_G\ C_B$ | $C_G$ |
| 0 | 1 | 1 | $C_R\ C_G\ C_B$ | $C_G\ C_B$ |
| 1 | 0 | 0 | $C_R\ C_G\ C_B$ | $C_R$ |
| 1 | 0 | 1 | $C_R\ C_G\ C_B$ | $C_R\ \ \ \ C_B$ |
| 1 | 1 | 0 | $C_R\ C_G\ C_B$ | $C_R\ C_G$ |
| 1 | 1 | 1 | $C_R\ C_G\ C_B$ | $C_R\ C_G\ C_B$ |

F I G . 7

CHARACTER SYNTHESIZER FOR INSERTING INTO VIDEO SIGNALS CHARACTERS HAVING THE COMPLEMENTARY COLORS WITH THE VIDEO SIGNALS

This is a continuation of application Ser. No. 424,726, filed Oct. 20, 1989, now abandoned.

BACKGROUND OF THE INVENTION

This invention concerns a character synthesizer for inserting character signals into video signals, and more particularly, a system for causing the characters to automatically have the complementary colors of the background video signals.

Conventionally, the character synthesizer can insert desired characters into desired positions of the video signals. It is widely used in video cameras having character generators, and video cassette recorders making it possible to insert characters into the screen during video editing, and also broadcasting. Such a conventional character synthesizer uses only monochromatic colors, for example, red, blue, green, or white, regardless of the colors of video signals, so that it is difficult or impossible to perceive the characters inserted into the image displayed on the screen if the color and the brightness of the video signal are the same as those of the character signal.

SUMMARY OF THE INVENTION

It is an object of the present invention to provide a character synthesizer wherein the color of the characters inserted into the image displayed on the screen always has the complementary relationship with that of the image by detecting the color and the brightness of the video signal.

It is another object of the present invention to provide a color component separating means for separating the color signal components according to the level of the color-phase detected by decoding the video signal to be displayed on the screen.

It is still another object of the present invention to provide a complementary color circuit for generating the signal complementary with the color of the video signal by encoding the color signal separated according to the level of the detected color-phase.

According to the present invention, a character synthesizer for inserting into video signals characters having the complementary colors with the video signals includes:

a video decoder for decoding the incoming video color signals to produce color-difference signals;

a color-phase detector for detecting the color-phase voltage of the color-difference signals and separately producing the color signals and the brightness signals;

an excessive white detector for comparing said brightness signals with a reference voltage to produce an excessive white signal when said brightness signals are excessively white;

a low saturation detector for comparing said color signals with the low saturation voltage to produce the low saturation signal when said color signals are in low saturation;

a character generator for generating character signals;

a complementary color detecting and control device for comparing the color-phase voltages of the video color signals with a plurality of reference color voltages of given colors to separate the components of the video color signals so as to obtain the colors complementary to the video color signals, the complementary colors being used to generate the color signals of the characters, the color signals being transformed according to the excessive white signal and the low saturation signal;

a video encoder for encoding the color signals of the characters;

a mixer for combining the incoming video signals and the video-encoded color signals of characters to output the character-combined video signals; and a delay device for delaying the character signals by the amount of time for complementary color transformation and encoding, and to generate a character synthesizing control signal to the mixer.

BRIEF DESCRIPTION OF THE ATTACHED DRAWINGS

For a better understanding of the present invention and to show how the same may be carried into effect, reference will now be made, by way of example, to the accompanying diagrammatic drawings, in which:

FIG. 1 is a block diagram of a character synthesizer according to the present invention;

FIG. 6 is a truth table of the digital encoder as shown in FIG. 2;

FIG. 7 is a truth table of the analog switch as shown in FIG. 2; and

DETAILED DESCRIPTION OF THE PREFERRED EMBODIMENT

Figure 2:
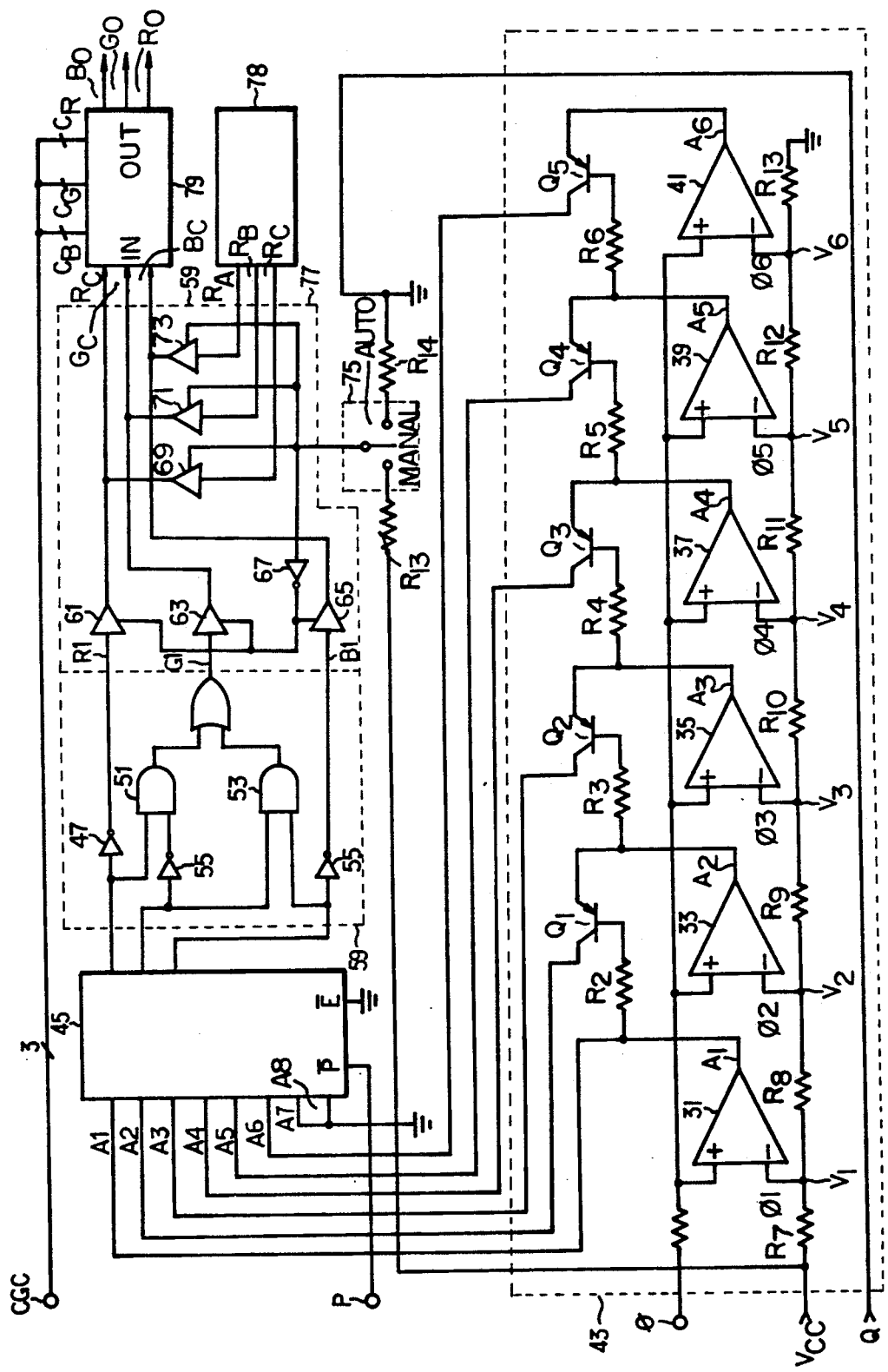
FIG. 2 illustrates a detailed circuit of the complementary color detecting and control circuit as shown in FIG. 1.

The present invention will now be described more specifically with reference to the drawings attached and only by way of example.

Referring to FIG. 1, video decoder 11 decodes the incoming video signals VCS to produce color-difference signals $R-Y$ and $B-Y$. The color-difference signals R-Y and B-Y are delivered to color-phase detector 13 that detects the phase voltages ($\phi$) of the color-difference signals and separates the color signals C and the brightness signals Y from each other. The brightness signals Y produced from the color-phase detector 13 are compared with a reference voltage VYi through excessive white detector 15 that generates excessive white signal Q if the brightness signals Y exceed the reference voltage VYi. The color signals C from the color-phase detector 13 are delivered to low saturation detector 17, which compares them with a reference voltage VCi to detect low saturation P.

The reference numeral 19 indicates the character generator for generating characters CGC. Complementary color detecting and control means 21 separates the color components of the color-phase signals $\phi$ produced from the color-phase detector 13, and produces character color signals VCG which are complementary with the present video color signals.

The character color signals are encoded by video encoder 23. The delay device 24 delays said signals by the time during which the video encoder 23 encodes the character color signals and produces them. The video signals VCS and the character color signals VCG are combined by mixer 25 which is controlled by the output CGD of the delay device 24.

Referring to FIG. 2, the complementary color detecting and control means 21 will now be more specifically described.

Color decomposing circuit 43 compares the color-phase voltages $\phi$ from the color-phase detector 13 with a plurality of reference voltages each representing a different color so as to separate the color components of the incoming video signals VCS. The color-decomposed signals from the color decomposing circuit 43 are encoded by digital encoder 45. The digital encoder 45 is enabled by the low saturation signal P. The output of the digital encoder 45 is transformed into the complementary colors R1, G1, B1 by complementary color control circuit 59. The character color signals CB, CG, CR of given colors are selected by analog switch 79. Rotary encoder switch 78 encodes a manual switching signal for selecting the character colors. One of the outputs of the complementary color control circuit 59 and the output of the rotary encoder switch 78 is selected by switching buffer 77 to control the analog switch 79. Switch 75 receives a given voltage VCC and the excessive white signals Q to deliver a control signal to the switching buffer 77.

The color separating circuit 43 comprises a plurality of comparators 31-41 for separating the colors of the color-phase voltages $\phi$ by comparing them with a plurality of reference voltages V1-V6. The reference voltages V1-V6 are produced by a plurality of resistors R7-R13 connected in series between the given voltage VCC and ground. The color-phase voltages $\phi$ are inputted into the non-inverting input terminals (+) of the comparators 31-41, while each of the reference voltages V1-V6 are inputted into one of the inverting input terminals (−). The outputs of the comparators 33-41 are each connected with one of the emitters of a plurality of switching transistors Q1-Q5, while the bases of the transistors are each connected with the output of the comparator 31-39 preceding the comparator whose output is inputted into its own emitter.

The complementary color control circuit 59 comprises first, second and third inverters 47, 49, and 55 for respectively inverting the first, second and third encoding color signals B1, B2, and B3 of the digital encoder 45; a first AND gate 51 for AND-operating the first encoding color signals B1 and the inverted second encoding color signals B2; a second AND gate 53 for AND-operating the second and third encoding color signals B2 and B3; and an OR gate 57 for OR-operating the outputs of the first and second AND gates 51 and 53.

The output of the first inverter 47 is the red color signals R1, the output of the OR-gate 57 the green color signal G1, and the output of the third inverter 55 the blue color signal B1. The switching buffer includes, from first to six the three state buffers 61, 63, 65, 69, 71, 73, respectively and an inverter 67. The complementary color signals R1, G1, and B1 of the complementary color control circuit 59 are supplied to the first to third three state buffers 61, 63 and 65, while the encoding signals RA, RB, RC of the rotary encoder switch 78 are delivered to the fourth to sixth three state buffers 69, 71 and 73. The outputs of these three state buffers are used to control the analog switch 79. The inverter 67 inverts the signal which controls the fourth to sixth three state buffers and delivers it to the first to third three state buffers.

Figure 3:
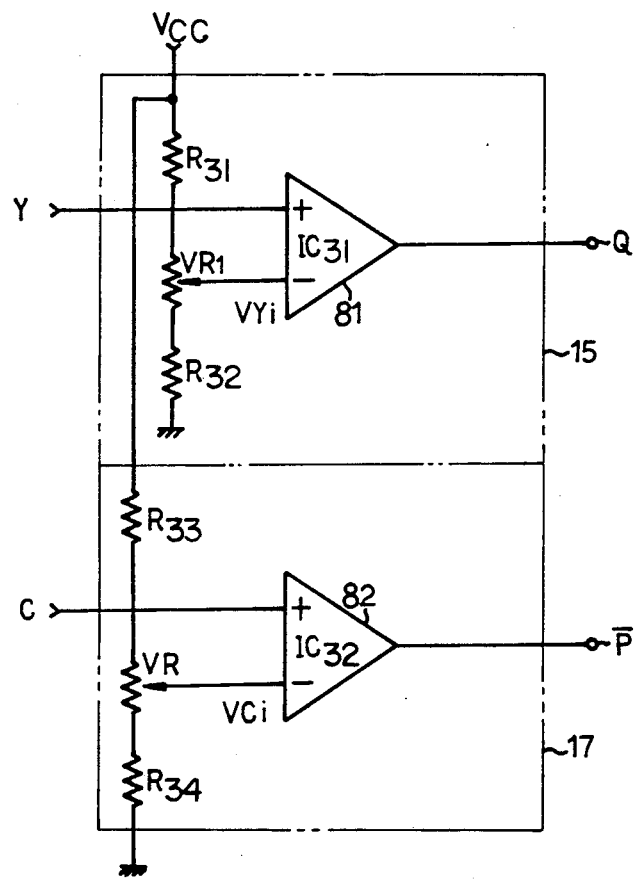
FIG. 3 illustrates in detail the excessive white detector and the low saturation detector as shown in FIG. 1.

Referring to FIG. 3, the excessive white detector 15 includes a comparator 81 whose inverting input terminal (−) receives the excessive white level voltage VYi established by resistor R31, variable VRI, and resistor R32 connected between a given voltage and the ground. The brightness signal Y of the color phase detector 13 is applied to the non-inverting input terminal (+) of the comparator 81 for comparing with the excessive white level voltage VYi. Hence, if the brightness signal Y exceeds the excessive white level voltage VYi, the excessive white signal Q outputted from the comparator 81 becomes high. Namely, it means that white level of the brightness signal Y is strong.

Likewise, the low saturation detector 17 includes a comparator 82 whose inverting input terminal (−) receives the low saturation level voltage VCi established by resistor R33, variable resistor VR2, and resistor R34 connected between the given voltage VCC and the ground. The color signal C of the color-phase detector 13 is applied to the non-inverting input terminal (+) of the comparator 82 for comparing with the low saturation level voltage VCi. Hence, if the color signal C is less than the low saturation level voltage VCi, the low saturation signal $\overline{P}$ outputted from the comparator 81 becomes low. Namely, it means the color signal C is low saturation.

Figure 4:
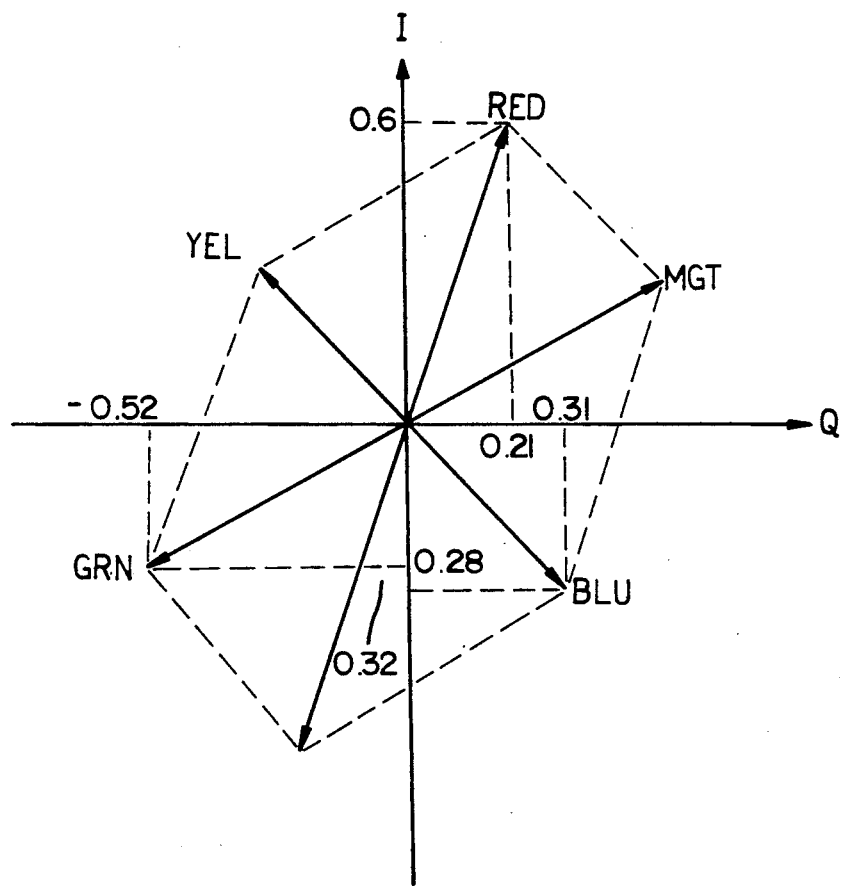
FIG. 4 illustrates the color signal and its vector of the color saturation 1 from the National Television System Committee.

FIG. 4 illustrates each color signal of the color saturation from the National Television System Committee, displayed on the vector scope.

The first, second and third encoding color signals B1-B3 of the digital encoder 45 as shown in FIG. 2 are shown in FIG. 5A, and the colors of the output signals R1, B1 and G1 of the complementary color control circuit 59 for logically combining the encoding color signals of the digital encoder 45 as shown in FIG. 2 are shown in FIG. 5B.

Figure 5C:
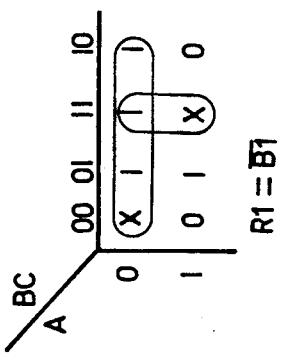
FIG. 5 is a truth table of the input and output of the complementary color control circuit as shown in FIG. 2.
Figure 5D:
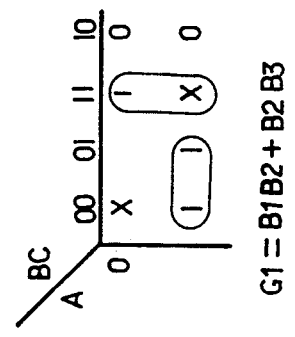
Figure 5E:
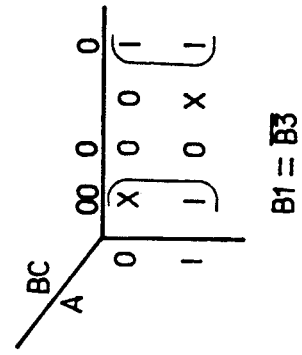

FIGS. 5C, 5D and 5E represent the mapping obtained by the logical combining of the complementary color control circuit 59.

Hereinafter, the operation of the inventive structure will be specifically described with reference to the attached FIGS. 1-8.

Referring to FIG. 1, the encoded composite video signal VCS is inputted into the video decoder 11 and the mixer 25, while the character generator 19 generates the same character signals CGC having respectively the red, green and blue colors, (which signals) are applied to the complementary color detecting and control device 21 and the delay device 24. The composite video signal inputted into the video decoder 11 is decoded into the color-difference signals R−Y and B−Y, thereby being inputted into the color-phase detector 13.

Figure 8:
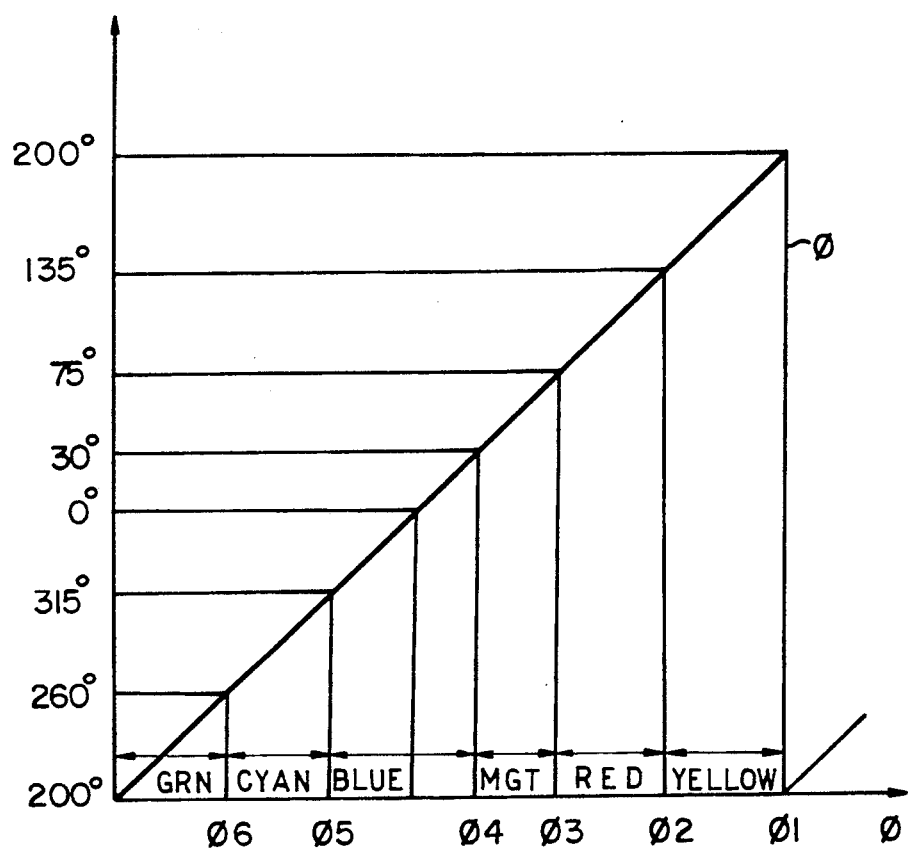
FIG. 8 illustrates the relationship between the phase detecting signal and each color signal in the color-phase detector as shown in FIG.2.

The color phase detector 13 detects, as shown in FIG. 8, the color-phase voltage $\phi$ inputted into the complementary color detecting and control device 21, and separates the brightness signal Y and the color signal C respectively inputted into the excessive white detector 15 and the low saturation detector 17. The color-phase detector 13 detects the phase level voltage $\phi$ according to the relationship as shown in FIG. 8.

Referring to FIG. 3, the comparator 81 of the excessive white detector 15 compares the excessive level voltage VYi established by the resistor R31, variable resistor VR1 and resistor R32 with the brightness signal Y delivered from the color-phase detector 13. Then, if the brightness signal Y exceeds the excessive white level voltage VYi, the output Q of the comparator 81 becomes high. Namely, if the excessive white signal Q is high, the video signal is very bright.

Referring to the low saturation detector 17 of FIG. 3, the low saturation level voltage VCi established by resistor R33, variable resistor VR2, and resistor R34 is compared with the color signal C delivered from the phase detector 13 by the comparator 82 which outputs the saturation signal $\overline{P}$ of saturation low if the color signal C is lower than the low saturation level voltage VCi. Of course, if the saturation of the color signal C is higher than the low saturation level voltage VCi, the saturation detecting signal $\overline{P}$ becomes high. The phase voltage $\phi$ produced by the color-phase detector 13 is inputted into the non-inverting input terminal (+) of the comparators 31–41 constructed as shown in FIG. 2, and the white level signal Q is connected with one end of the switch 75. The low saturation signal $\overline{P}$ from the low saturation detector 17 is inputted as the control signal into the digital encoder 45, and the character signal CGC of the character generator 19 is applied to the input terminal of the analog switch 79.

The comparators 31–41 compare the phase voltage $\phi$ produced from the phase detector 13 with the reference voltage V1–V6 established by the resistors R7–R13. The reference voltages V1–V6, in order of descending voltage value, V1 being the greatest of magnitude, V6 being the smallest, respectively represent the phase voltages $\phi1$, $\phi2$, $\phi3$, $\phi4$, $\phi5$ and $\phi6$.

Hence, if the phase voltage $\phi$ produced from the phase detector 13 is between the reference voltages V4 and V3, the outputs A4, A5 and A6 of the comparators 37, 39 and 41 become logic high, and the outputs A1 and A2 of the comparators 31 and 33 become logic low, thereby satisfying the following condition.

If the phase voltage $\phi$ from the color-phase detector 13 satisfies the condition $\phi n < \phi < \phi n-1$, An is $\phi n - x = L(low)$ and $\phi n + y = H(high)$, wherein n represents the natural numbers including zero, x the natural numbers excluding zero, and y the natural numbers including zero.

Meanwhile, each of the outputs of the comparators 33–41 is connected with one of the emitters of the switching transistors Q1–Q5, while each of the bases of the switching transistors Q1–Q5 receive the output of the preceding comparator 31–39, as shown in FIG. 2. Thus, only one of the outputs of the comparators 31–41 is inputted into the digital encoder 45. Namely, if $\phi n < \phi < \phi n-1$, the output of the comparator receiving only the reference voltage $\phi n$ is only outputted through the switching transistors. For example, if $\phi1 > \phi > \phi2$, the output A1 of encoder 45, and if $\phi2 > \phi > \phi3$, the output A2 of the comparator 33 is only inputted as high signal into the digital encoder 45 through the switching transistor Q1.

Here, $\phi = V1$, $\phi2 = V2$, $\phi$ is the phase detecting voltage. Accordingly, the digital encoder 45 encodes the received color-separated signals A1–A6 as shown in FIG. 6, thereby producing the first, second and third encoding color signals B1, B2 and B3.

Referring to FIG. 6, the combination of the first to third encoding color signals B1–B3 represents the color.

For example, if the combination of B1, B2 and B3 is 001, it indicates the green. The digital encoder 45 is enabled by the low saturation detecting signal $\overline{P}$ of the low saturation detector 17. Namely, if the saturation of the color signal C is lower than the low saturation level voltage VCi, the low saturation signal $\overline{P}$ becomes low. Hence, the digital encoder 45 is disabled, so that the signals B1, B2 and B3 all become low regardless of the input logic. From the above description, it will be appreciated that if the color saturation of the incoming video signal is so low as not to distinguish the colors, the character color signal is caused to have white. Thus, the digital encoder 45 is enabled when the color saturation is in the proper state, thereby encoding the inputted color-decomposed signals A1–A6 as shown in the table of FIG. 6.

The color states simplified according to the first, second, and third encoding color signals B1, B2 and B3 of the digital encoder 45 are shown in the table of FIG. 5A. The first, second and third encoding color signals B1, B2 and B3 of the digital encoder 45 are transformed into the complementary color signals R1, G1 and B1 by the complementary color control circuit 59. For example, if the logic of the first, second and third encoding color signals B1, B2 and B3 of the digital encoder 45 is 001 indicating that the video signal to be displayed has the green color GRN, the logic of the complementary color signals R1, G1 and B1 produced by the complementary control circuit 59, is, as shown in FIG. 5B, 100 indicating the color complementary with the green. Thus, the complementary color control circuit 59 always transforms the logic of the first, second and third color signals B1, B2 and B3 of the digital encoder 45 into the logic of the complementary color signals R1, G1 and B1 delivered to the first, second and third buffers 61, 63 and 65. The complementary color control circuit 59 is designed according to the minimization of FIGS. 5C, 5E and 5D.

Meanwhile, the outputs of the first, second and third buffers 61, 63 and 65 are controlled by the switch 75. Thus, if the switch 75 is placed in the automatic position, the low signal caused by the resistor R14 is inverted by the inverter 67 and applied as the control signal to the first, second and third buffers 61, 63 and 65, so that the complementary color signals R1, G1 and B1 are inputted as the control signal into the analog switch 79.

If the excessive white signal Q is low, (i.e., the brightness signal Y of the video signal is not excessive white), the analog switch 79 outputs the colors of the incoming blue character signal CB, green character signal CG and red character signal CR as shown in the table of FIG. 7, according to the buffering signals of the first, second and third buffers 61, 63 and 65. For example, if the logic of the output signals B1, B2 and B3 of the digital encoder 45 is 010 indicating the video signal being cyan CYAN series, the logic of the complementary color signals R1, G1 and B1 of the complementary control circuit 59 is 101, so that the analog switch 79 outputs the red character signal CR and the blue character signal CB which are complementary with the cyan.

If the switch 75 is placed in the manual position, the first to third buffers 61, 63 and 65 are disabled and the fourth to sixth buffers 69, 71 and 73 are enabled, so that the logic signals RA, RB, RC outputted from the rotary encoder switch 78 are inputted as the control signal into analog switch 79. Thus, the analog switch 79 selects arbitrary colors regardless of the colors of the video signal displayed, thereby producing the outputs as shown in the following table 1-1.

TABLE 1-1

| Number | RA | RB | RC | RO | GO | BO |
|---|---|---|---|---|---|---|
| 1 | 0 | 0 | 0 | X | X | X(white) |
| 2 | 0 | 0 | 1 | CR | X | X |
| 3 | 0 | 1 | 0 | X | CG | X |
| 4 | 0 | 1 | 1 | CR | CG | X |
| 5 | 1 | 0 | 0 | X | X | CB |
| 6 | 1 | 0 | 1 | CR | X | CB |
| 7 | 1 | 1 | 0 | X | CG | CB |
| 8 | 1 | 1 | 1 | CR | CG | CB |

*X indicates no output.

If the switch 75 is moved to the automatic position, and the outputs R1, G1 and B1 of the complementary control circuit 59 are inputted as the control signal into the analog switch 79, the character color signal is automatically selected to have the complementary color with the video signal. In this case, if the excessive white signal Q becomes high, a voltage drop occurs across the resistor R14 so that the automatic position becomes high. Thus, when the brightness signal Y of the video signal displayed is very bright, the output of the rotary encoder switch 78 controls the analog switch 79, so that the difficulty due to excessive light in distinguishing characters is automatically eliminated. Hence, the signal of the color character outputted from the analog switch 79 has the complementary color with the video signal, and is inputted into the video encoder 23 as shown in FIG. 1.

Meanwhile, the video encoder 23 receiving the color character signals outputted from the analog switch 79 encodes the color character signals, producing the character signals VCG supplied to mixer 25 that also receives the video signals VCS. Mixer 25 combines the video signals VCS and the character signals VCG to produce the composite video signal VCSO. In this case, delay device 24 delays the character signals CGC by the time for the complementary color transformation and video encoding to supply them as the control signal for mixing the character signals and the incoming video signals VCS, to mixer 25. The composite video signal VCSO outputted from mixer 25 may be displayed in the monitor, or recorded into a recording system such as a VCR.

As described above, the present inventive structure not only causes the character signals to have the complementary colors with the video signals displayed by analyzing the colors of the video signals, but also suitably transforms the colors of the character signals according to the excessive white of the brightness signal of the video signal and the low saturation of the color signal, so that the characters are distinctly displayed on the screen.

What is claimed is:

1. A character synthesizer for inserting into video signals, character signals having complementary colors to said video signals, comprising:
    video decoder means for decoding video signals to produce color-difference signals;
    color-phase detector means for detecting a color-phase voltage from said color-difference signals, and separately producing color signals and brightness signals;
    excessive white detector means for comparing said brightness signals with a reference voltage to produce an excessive white signal when said brightness signals are excessive white;
    low saturation detector means for comparing said color signals with a low saturation voltage to produce a low saturation signal when said color signals are in low saturation;
    character generator means for generating character signals;
    complementary color detecting and control means for comparing said color-phase voltage with a plurality of reference color voltages of given colors to obtain colors complementary to said video signals, said complementary colors being used to produce color signals for the characters of said character signals, said color signals for the characters of said character signals being produced in accordance with said excessive white signal and said low saturation signal;
    video encoder means for encoding said color signals for the characters of said character signals to provide encoded signals;
    mixer means for combining said video signals and said encoded color signals to generate character-combined video signals; and
    delaying means for delaying said character signals by a time necessary for said complementary colors to be produced in order to generate a character synthesizing control signal to said mixer means.

2. A character synthesizer as claimed in claim 1, wherein said complementary color detecting and control means comprises:
    color decomposing means for comparing said color-phase voltage with a plurality of reference voltages each representing a different color for separating the colors of said video signals to provide color-decomposed signals;
    digital encoder means for encoding said color-decomposed signals in accordance with said low saturation signal to provide encoded color-decomposed signals;
    complementary color control means for transforming said encoded color signals into first complementary color signals;
    rotary encoder switch means for encoding second complementary color signals selected by a user;
    analog switch means for generating said color signals for the characters of said character signals according to one of the outputs of said complementary color control means and said rotary encoder means;
    switching buffer means for supplying a switching control signal to control said analog switch means; and
    switch means for supplying a control signal to said switching buffer in response to a given voltage and said excessive white signal.

3. A character synthesizer as claimed in claim 2, wherein said color decomposing means comprises:
    a plurality of resistors connected in series between a given voltage and ground for producing a plurality of reference voltages;
    a plurality of comparators for separating color components of said color-phase voltage by comparing said color phase voltage to a plurality of reference voltages; and
    a plurality of switching transistors for controlling the outputs of said comparators, the emitters of said transistors each receiving one of the outputs of said comparators, the bases of said transistors each receiving the output of a comparator preceding a comparator whose output is an input into its own emitter.

4. A character synthesizer as claimed in claim 2, wherein said complementary color control means comprises:
- first, second and third inverters for respectively inverting the first, second and third encoding color signals of said digital encoder means;
- a first AND gate for AND-operating said first encoding color signal and said inverted second encoding color signal;
- a second AND gate for AND-operating said second and third encoding color signals; and
- an OR gate for OR-operating the outputs of said first and second AND gates.

5. A character synthesizer for inserting into video signals, character signals having complementary colors to said video signals, comprising:
- video decoder means for decoding video signals to produce color difference signals;
- color phase detector means for producing color phase voltage signals, color signals, and brightness signals in response to said color difference signals;
- excessive white detector means for comparing said brightness signals with a whiteness reference voltage to produce an excessive white control signal;
- low saturation detector means for comparing said color signals with a low saturation reference voltage to produce a low saturation control signal;
- character generator means for generating characer signals;
- complementary color detecting and control means for separating color componsnts of said color phase voltage signals, and producing character color signals being complementary in colors in said video signals;
- video encoder means for encoding said character color signals and producing encoded character color signals;
- mixer means for combining said video signals and said encoded character color signals to produce a composite video signal; and
- delay means for controlling said mixer means to produce compensating delays for accommodating for operational delays by said complementary color detecting and control means and said video encoder means.

6. The character synthesizer of claim 5, wherein said complementary color detecting and control means uses a plurality of comparators to compare said color phase voltage signals with a plurality of color reference voltages to produce said character color signals being complementary in colors to said video signals.

7. The character synthesizer of claim 5, wherein said complementary color detecting and control means uses a digital encoder enabled by said low saturation control signals to produce encoded color separated signals, and uses a plurality of inverters and gates to produce said character color signals being complementary in colors to said video signals in response to said encoded color separated signals.

8. The character synthesizer of claim 5, wherein said complementary color detecting and control means uses a plurality of switching transistors and a plurality of comparators, wherein each comparator receives said color phase voltage signals on a non-inverting terminal located on said comparator and receives said color reference voltage on an inverting terminal also located on said comparator and said plurality of switching transistors provide an emitter on each switching transistor coupled to receive an output from each said comparator and provide a base coupled to receive an output from another comparator.

9. A method for inserting into video signals, character signals having complementary colors to said video signals, whereby a composite video signal is decoded and separated into color difference signals used to produce color phase signals, color signals and brightness signals, said color signals and said brightness signals used to control a complementary color generating device which produces complementary color character signals in response to said color phase signals and character signals from a character generator, said complementary color character signals used to generate video encoded signals which are mixed with said composite video signals in a video signal mixing device controlled by a delay device delaying said mixing for a time necessary for said video encoded signals to be generated.

10. A character synthesizer for inserting character signals into a video signal having complementary colors in a background of said video signal, comprising:
- decoder means for decoding video signals to produce color difference signals;
- phase detecting means for separately producing a color phase voltage signals, a color signal and a brightness signal in response to said color difference signals;
- comparator means for comparing said brightness signal with a first reference voltage to produce an excessive white signal, and for comparing said color signal with a second reference voltage to produce a low saturation signal;
- character generator means for generating character signals;
- separator means for separating color components of said color phase voltage signal to obtain colors complementary to said video signal, for producing color character signals having colors complementary to said video signals in response to said excessive white signal and said low saturation signal;
- video encoder means for encoding said color character signals to provide encoded color character signals;
- mixer means for combining said video signal and said encoded color characer signals; and
- delay means for delaying said character signals at a predetermined time to control said mixer means for combining said video signal and said encoded color character signals to generate color character-combined video signals.

11. The character synthesizer of claim 10, wherein said predetermined time is a time necessary to obtain said colors complementary to said video signal.

12. The character synthesize of claim 11, wherein said separator means comprises a plurality of comparators to compare said color phase voltage signal to a plurality of reference voltages to obtain colors complementary to said video signal.

13. The character synthesizer of claim 11, wherein said separator means comprises digital encoder means enabled by said low saturation signal to produce respective encoded color signals, a plurality of inverter and gating means to produce colors complementary in response to said encoded color signals.

14. The character synthesizer of claim 11, wherein said separator means comprises a plurality of switching transistors and a plurality of comparators, wherein each comparator receives said color phase voltage signal on a non-inverting terminal and said reference voltage on an inverting terminal, and said plurality of switching transistors provide an emitter on each switching transistor coupled to receive an output from each of said comparators and a base coupled to receive an output from the preceding comparator.

15. The character synthesizer of claim 11, wherein said separator means comprises:
   color decomposing means for separating color components of said color phase voltage signal by comparing said color phase voltage signal with a plurality of reference voltages each representing a different color to provide color separated signals;
   digital encoder means for encoding said color separated signals in accordance to said low saturation signal to provide encoded color separated signals;
   complementary color control means for transforming said encoded color separated signals into first complementary color signals;
   rotary encoder means for encoding second complementary color signals selected by a user for said character signals;
   control switch means for providing a control signal in response to a given voltage and said excessive white signal;
   analog switch means for generating color character signals having colors complementary to said video signal in accordance with one of the outputs of said complementary color control means and said rotary encoder means; and
   switching buffer means for receiving said control signal, and for selecting one of the outputs of said complementary color control means and the output of said rotary encoder means to control said analog switch means.

16. The character synthesizer of claim 15, wherein said color decomposing means comprises:
   a plurality of resistors connected in series between a given voltage and ground for producing a plurality of reference voltages;
   a plurality of comparators for separating color components of said color phase voltage signals by comparing said color phase voltage signals to said plurality of reference voltages; and
   a plurality of switching transistors for controlling the outputs of said comparators, wherein the emitters of said transistors each receiving one of the outputs of said comparators, the bases of said transistors each receiving the output of the comparator preceding to the comparator whose output is an input into its own emitter.

17. The character synthesizer of claim 16, wherein said complementary color control means comprises:

first, second and third inverters for respectively inverting the first, second and third encoded color signals of said digital encoder means;
a first AND gate for AND-operating said encoded color signals and said inverted second encoded color signals;
a second AND gate for AND-operating said second and third encoded color signals; and
an OR gate for OR-operating the outputs of said first and second AND gates.

18. A method for inserting character signals into video signals having complementary colors in a background of said video signals, comprising the steps of:
   decoding incoming video signal to produce color difference signals;
   separating said color difference video signals into color phase voltage signals, color signals, and brightness signals;
   comparing said color signals with a first reference voltage to produce a low saturation signal;
   comparing said brightness signals with a second reference voltage to produce an excessive white signal;
   independently generating character signals;
   separating color components of said color phase voltage signals to obtain colors complementary to said video signals, for producing color character signals having colors complementary to said video signal in response to said excessive white signal and said brightness signals;
   encoding said color character signals; and
   combining said incoming video signals and said encoded color character signals by a control signal generated from delaying said character signals by a predetermined time to obtain said colors complementary to said video signals, for generating color character-combined video signals.

19. The method of claim 18, wherein said step of separating color components further uses a digital encoder enabled by said low saturation signals to produce respective encoded color signals, and a plurality of inverter and gating means for producing colors complementary to said video signals in response to said encoded color signals.

20. The method of claim 18, wherein said step of separating color components further comprises the steps of:
   separating color components from said color phase voltage signals by comparing said color phase voltage signals with a plurality of reference voltages each representing a different color to provide color separated signals;
   digitally encoding said color separated signals according to said low saturation signal; and
   transforming said encoded color signals into color complementary to said video signal using a plurality of inverters and logic gates.

* * * * *

UNITED STATES PATENT AND TRADEMARK OFFICE
CERTIFICATE OF CORRECTION

PATENT NO. : 5,126,832
DATED : 30 June 1992
INVENTOR(S) : Hyo-Sam LEE, et al.

It is certified that error appears in the above-indentified patent and that said Letters Patent is hereby corrected as shown below:

IN THE ABSTRACT

Line 3, before a period " . ", insert

--, by analyzing the colors of the video signals--,

Line 6, after "color-phase", change "voltage" to

--voltages--,

Column 3, Line 4, after "said", insert --character--,

Line 64, before "three", change "six the" to --sixth--,

Column 4, Line 20, before "white" insert --the--,

Line 35, before "from", insert -- 1 --,

UNITED STATES PATENT AND TRADEMARK OFFICE
CERTIFICATE OF CORRECTION

PATENT NO. : 5,126,832
DATED : 30 June 1992
INVENTOR(S) : Hyo-Sam LEE, et al.

It is certified that error appears in the above-indentified patent and that said Letters Patent is hereby corrected as shown below:

Column 5   Line 15,   after "of", change "saturation low" to

--low saturation--,

IN THE CLAIM

Column 9,   Line 37,   before "said", change "in" to --to --:

Signed and Sealed this

Twenty-fifth Day of June, 1996

*Attest:*

*Attesting Officer*

BRUCE LEHMAN

*Commissioner of Patents and Trademarks*